Feb. 15, 1955   R. L. GAMAUNT   2,702,196
MOTORCYCLE SIDECAR COUPLING MEANS
Filed Sept. 8, 1952   2 Sheets-Sheet 2
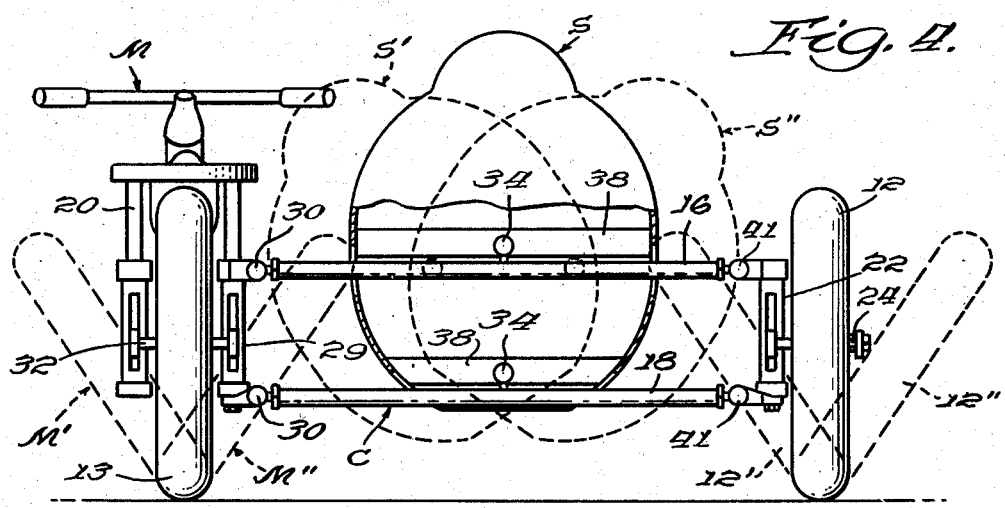
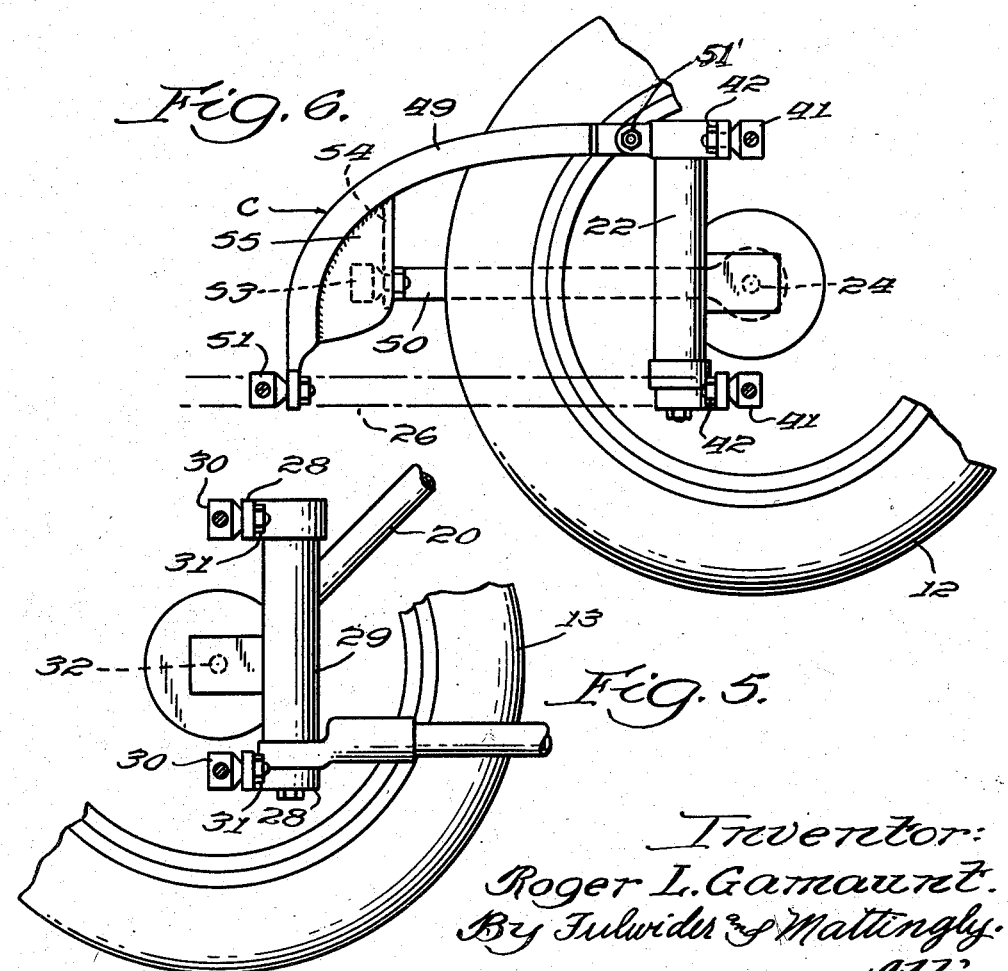
Inventor:
Roger L. Gamaunt.
By Fulwider & Mattingly.
Attys.

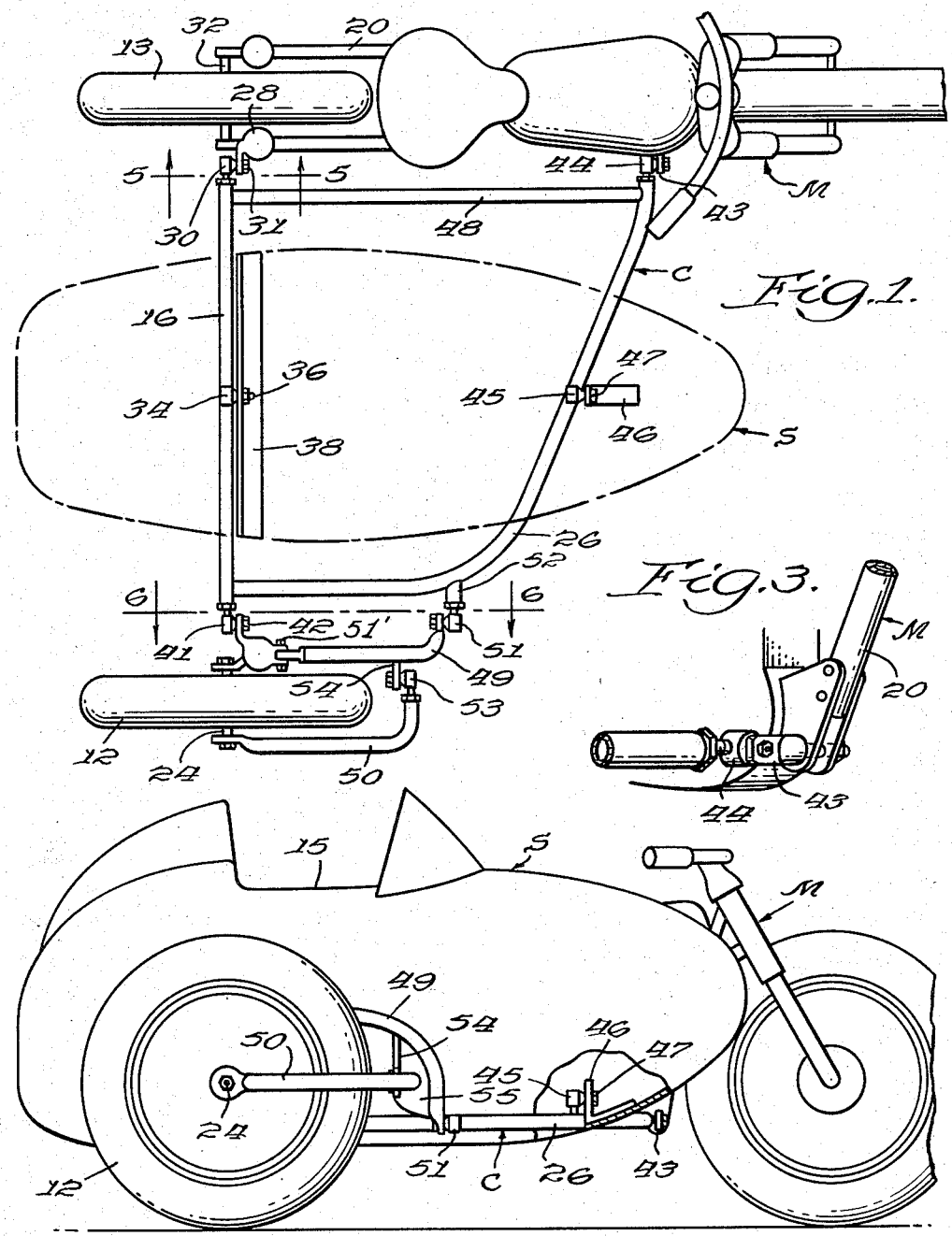

United States Patent Office 2,702,196
Patented Feb. 15, 1955

2,702,196

MOTORCYCLE SIDECAR COUPLING MEANS

Roger L. Gamaunt, Redondo Beach, Calif.

Application September 8, 1952, Serial No. 308,404

4 Claims. (Cl. 280—203)

The present invention relates generally to the field of motorcycles, and more particularly to novel connection means for coupling a sidecar to a motorcycle.

Conventionally, a sidecar is rigidly coupled to a motorcycle by means of a plurality of bars, rods, or the like. By virtue of this rigid connection the motorcycle cannot be inclined as it is driven around a curve. Additionally, any vertical forces directed upon the wheel of the sidecar as for example, when the wheel passes over a vertical discontinuity in the rod, will be directly transferred to the frame of the motorcycle. This arrangement gives rise to several important disadvantages whereby the sidecar has not heretofore come into especially wide acceptance.

One of the most serious disadvantages of rigidly coupling a sidecar to a motorcycle is the imposition of severe strains upon the frame of the motorcycle by virtue of its connection to the sidecar, which strain is especially pronounced when the motorcycle and sidecar combination is being driven around a corner or is traveling over a rough road. The severity of such strain is sufficient that it commonly results in the breaking of the motorcycle frame, either under the influence of a sudden shock, or by progressive fatigue.

Another serious disadvantage lies in the poor handling qualities of a motorcycle equipped with a sidecar as compared to a motorcycle not so equipped. These handling qualities are indeed so poor that when it is desired to turn a corner, the rate of speed of the motorcycle and sidecar combination must be reduced appreciably, inasmuch as to round a turn or corner at high speed is to court a dangerous skid and/or tipping.

A further disadvantage in the conventional rigid coupling of a sidecar to a motorcycle lies in the rough ride afforded to the passenger of the sidecar.

It is a major object of the present invention to provide novel connection means for use in coupling a sidecar to a motorcycle in such a manner that such connection will not impose undue strains upon the frame of the motorcycle, the handling qualities of the motorcycle will not be seriously affected, and the side car may provide a comfortable ride. The elimination of these three major disadvantages by the use of the coupling means of the present invention arises by virtue of the fact that such coupling means permits the sidecar and its supporting wheel to simultaneously assume the same vertical angle as that of the rear wheel of the motorcycle.

It is a further object of the present invention to provide means for coupling a sidecar to a motorcycle which is simple of design and rugged of construction whereby it may have a long service life.

It is another object of the present invention to provide means for coupling a sidecar to a motorcycle which may be adapted for use with any conventional type of motorcycle without requiring extensive modifications thereto.

A further object of the present invention is to provide means for coupling a sidecar to a motorcycle, which means permits the sidecar to be attachable to and detachable from a motorcycle with a minimum of time and effort.

An additional object of the present invention is to provide means for coupling a sidecar to a motorcycle in such a manner that the handling qualities of the motorcycle and sidecar combination may remain the same regardless of the weight being supported by the sidecar.

Other objects and advantages of the present invention will become apparent from the following detailed description of a preferred embodiment thereof, taken in conjunction with the accompanying drawings wherein:

Figure 1 is a top plan view of a motorcycle and sidecar combination embodying the novel coupling means of the present invention;

Figure 2 is a side elevational view of said motorcycle and sidecar combination;

Figure 3 is an enlarged view of a detail of construction shown in Figures 1 and 2;

Figure 4 is a rear view of the motorcycle and sidecar combination disclosed in Figures 1 and 2, and showing the mode of operation of the novel coupling means of the present invention;

Figure 5 is an enlarged fragmentary view taken along line 5—5 of Figure 1; and,

Figure 6 is an enlarged fragmentary view taken along line 6—6 of Figure 1.

Referring to the drawings, there is shown a conventional motorcycle M to which is coupled a conventional sidecar S by means of novel coupling means C embodying the present invention. The coupling means C includes a plurality of bar members which are pivotally connected to the motorcycle, the sidecar and each other so as to permit the sidecar and its supporting wheel 12 to simultaneously assume the same vertical angle as that of the rear wheel 13 of the motorcycle. This relationship is clearly disclosed in Figure 4 wherein the solid line showing represents the relative positions of the motorcycle M, its sidecar S and the latter's wheel 12 when the motorcycle and sidecar combination are following a straight line pattern. The dotted lines in this figure represents the positions assumed by the motorcycle and sidecar combination during the execution of a left turn and a right turn. The singly primed reference letters M' and S', together with the numeral 12' show the positions assumed by the motorcycle sidecar and the latter's wheel during a left turn, and the corresponding double primed reference letters and numeral indicating the position assumed during a right turn.

It will be apparent that the novel non-rigid coupling means C provides a decided advantage over the conventional rigid coupling means normally utilized in connecting a motorcycle and sidecar. This is true since not only may the motorcycle M be inclined as it is driven around a curve, but additionally both the sidecar S and its wheel 12 will also be capable of being inclined to the same extent as the motorcycle. With this arrangement, upon rounding a curve, the passenger seated in the sidecar S will not be thrown to one side of the cockpit 15 thereof, as occurs where the sidecar is rigidly coupled to a motorcycle. Instead, such passenger will be supported with his body in a centered position relative to the side of the cockpit 15; the major portion of his weight being supported by the seat and floorboards of the sidecar. Moreover, since the center of gravity of a loaded sidecar is moved toward the inside of the turn, the likelihood of the sidecar overturning under the influence of centrifugal force is appreciably reduced. The fact that the sidecar's wheel 12 may be inclined during a turn not only results in increased resistance to skidding, but also provides for more even wear of the tire thereon.

With more particular reference to the preferred form of construction disclosed in the accompanying drawings, and as will be seen in Figure 4, the coupling means C broadly comprises a parallelogram type structure which includes a pair of upper and lower vertically spaced horizontal support bars 16 and 18, respectively. These bars are each pivotally connected at their inner ends to the rear portion of the motorcycle frame 20 and at their outer ends to the upper and lower ends of a shock absorber 22; the latter mounting the inner end of an axle 24 upon which is journaled the wheel 12. The support bars 16 and 18 are shown connected to the front portion of the motorcycle frame 20 by means of a horizontally extending strut 26. The inner end of this strut 26 is pivotally connected to frame 20, while the outer end thereof is seen to be rigidly affixed to the outer end of the lower support bar 18. The mid-portion of the two support bars 16 and 18 and the mid-portion of the strut 26 are shown pivotally connected to the mid-portion of the sidecar at vertically spaced points thereon.

More particularly, the support bars 16 and 18 and the strut 26 will preferably be of tubular metallic construction utilizing a steel alloy, or the like, which combines high strength with low weight. Preferably, the inner ends of these support bars will be joined to the motorcycle frame 20 by means of anchor elements 28 rigidly affixed to the left rear shock absorber 29 of the motorcycle, and pivot joints 30 secured to the inner ends of the support bars and connectable to the anchor elements 28 by nuts 31, whereby the support bars will be adapted for vertical transverse movement relative to the frame 20. It has been found desirable to arrange the bars 16 and 18 in such a manner relative to the motorcycle frame 20 that the sidecar axle 24 is normally aligned with the rear axle 32 of the motorcycle. The mid-portions of the support bars are seen to mount a pair of pivot joints 34, which joints include bolts 36 securable to a cross piece 38 of the sidecar. The outer ends of the support bars are seen to mount pivot joints 41 securable to the upper and lower ends of the vertically extending shock absorber 22 by nuts 42 whereby the support bars will be adapted for transverse vertical pivotal movement relative to the shock absorber. The axle 24 is adapted for vertically dampened movement relative to the shock absorber 22. This damping action may take place by the utilization of conventional spring and/or hydraulic arrangements. Preferably, the degree of dampening of the shock absorber will be adjustable in accordance with the load carried within the sidecar. In this manner the handling qualities of the motorcycle and sidecar combination may remain substantially the same regardless of the weight being supported by the sidecar.

The horizontal strut 26 is seen to include an outwardly and rearwardly inclined front portion and a longitudinally extending rear portion. The inner end of the front portion of the strut is shown joined to the front portion of the motorcycle frame by means of an anchor element 43 rigidly affixed to the frame and a pivot joint 44 mounted at the inner end of the strut whereby the latter will be adapted for transverse vertical pivotal movement relative to the frame. The mid-portion of the strut mounts a pivot joint 45 securable to a bracket 46 disposed at the center line of the sidecar by means of a nut 47. A longitudinal spacer bar 48 may be used to rigidly interconnect the inner end portions of the strut 26 and the lower support bar 18.

In order to restrain excess longitudinal rocking motion of the sidecar S, the coupling means C will preferably include an upwardly and rearwardly curved longitudinally extending stabilizer bar 49 and a longitudinally extending rocker arm 50. The front end of the stabilizer bar 49 is shown connected to a pivot joint 51 affixed to the strut 26 by means of a short link 52 whereby the stabilizer bar is adapted for transverse vertical pivotal movement relative to the strut. The rear end of the stabilizer bar 49 is shown pivotally joined to the upper end of the shock absorber 22 for longitudinal vertical pivotal movement relative thereto by a pivot joint 51'. The rocker arm 50 is seen to mount the pivot joint 53 connected to an ear 54 affixed to a plate 55, which plate is secured, as by welding, to the intermediate portion of the stabilizer bar. In this manner, the front end of the rocker arm 50 is adapted for transverse vertical pivotal movement relative to the stabilizer bar 49. The rocker arm is connected at its rear end to the outer end of the sidecar axle 24.

In operation, referring to Figure 4, at such time as the motorcycle is caused to change its course from a straight line direction of travel into a left turn, for example, the upper support bar 16 will be moved to the left relative to the lower support bar 18; said bars remaining parallel to each other and to the ground. Such movement will cause the simultaneous movement of the shock absorber 22 from its normal upright position into an inclined position parallel to the shock absorber 29 of the motorcycle. The sidecar axle 24 and its wheel 12 being angularly fixed relative to shock absorber 22 will likewise be inclined so as to assume the same vertical angle as that of the rear axle 32 and rear wheel 13 of the motorcycle. Inasmuch as the sidecar S is pivotally connected to the mid-portions of the support bars 16 and 18, and of the strut 26, it will also be caused to assume the same vertical angle as that of the rear wheel of the motorcycle and its own wheel 12. After the turn has been completed and the motorcycle is again returned to its normal upright position, the sidecar and its wheel will likewise be returned to their original positions.

It should be observed that the aforedescribed novel coupling means C not only permits the sidecar and its wheel to be tilted to the proper angle during the execution of a turn with the motorcycle and sidecar combination, but it also serves to prevent the transmission of shocks from the sidecar wheel 12 to the motorcycle frame 20 as the wheel 12 passes over vertical discontinuities found in the surface over which the combination travels. This feature is very advantageous in providing greater comfort for the motorcycle rider and the sidecar passenger, and in preventing the imposition of damaging shocks upon the motorcycle frame. It should be further observed that by providing easily removable connection means at the inner ends of the support bars 16 and 18, and the strut 26, the sidecar may be readily attachable to and detachable from a motorcycle.

Although there has been heretofore described what is presently believed to be the preferred embodiment of the present invention, it will be apparent to those skilled in the art that various modifications and changes may be made thereto without departing from the spirit of the invention or the scope of the appended claims.

I claim:

1. Connection means for use in coupling a sidecar to a motorcycle, comprising: an axle for supporting the wheel of said sidecar; a shock absorber mounting the inner end of said axle; a pair of vertically-spaced horizontally extending support bars, each bar being pivotally and detachably connected at its inner end to the rear portion of the motorcycle and at its outer end to said shock absorber; strut means pivotally and detachably connected at its inner end to the front portion of said motorcycle and connected at its outer end to the outer end of the lower of said support bars; a longitudinally extending stabilizer bar pivotally connected at its front end to said strut means and at its rear end to the upper end of said shock absorber; a longitudinally extending rocker arm pivotally connected at its front end to the intermediate portion of said stabilizer bar and connected at its rear end to the outer end of said axle; and means for pivotally connecting the intermediate portions of said support bars and said strut means to said sidecar whereby said wheel and said sidecar may simultaneously assume a vertical angle similar to that of the rear wheel of said motorcycle.

2. Connection means for use in coupling a sidecar to a motorcycle, comprising: an axle for supporting the wheel of said sidecar; a shock absorber mounting the inner end of said axle; a pair of parallel vertically-spaced horizontal support bars disposed transversely to the direction of travel of the motorcycle; means for pivotally connecting the inner ends of said bars to vertically-spaced points on the rear portion of the frame of the motorcycle for transverse vertical pivotal movement relative thereto; means for pivotally connecting the upper and lower ends of said shock absorber to the outer ends of said support bars; horizontally extending strut means rigidly affixed at its outer end to the lower of said support bars; means pivotally connecting the inner end of said strut means to the front portion of the frame of the motorcycle for transverse vertical pivotal movement relative thereto; a longitudinally extending stabilizer bar pivotally connected at its front end to the outer portion of said strut means for transverse vertical pivotal movement relative thereto, and pivotally connected at its rear end to the upper end of said shock absorber for longitudinal vertical pivotal movement relative thereto; a longitudinally extending rocker arm pivotally connected at its front end to the intermediate portion of said stabilizer bar for transverse vertical pivotal movement relative thereto, and connected at its rear end to the outer end of said axle; and means for pivotally connecting the intermediate portions of said support bars and said strut means to said sidecar whereby said wheel and said sidecar may simultaneously assume a vertical angle similar to that of the rear wheel of said motorcycle.

3. Connection means for use in coupling a sidecar to a motorcycle, comprising: an axle for supporting the wheel of said sidecar normally adapted to be coaxially aligned with the rear axle of the motorcycle; a vertically extending shock absorber mounting the inner end of said first-mentioned axle; a shock absorber mounting said rear axle; a pair of parallel vertically-spaced horizontal support bars adapted to be normally aligned with said rear axles; means for pivotally connecting the inner ends of said bars to the rear portion of the frame of the motorcycle for transverse vertical pivotal movement relative thereto; means for pivotally connecting the outer ends of said bars to said first-mentioned shock absorber for vertical pivotal movement relative thereto; a horizontal strut having an outwardly and rearwardly inclined front portion and a longitudinally extending rear portion; means for pivotally connecting the front end of said strut to the front portion of the frame of the motorcycle for transverse vertical pivotal movement relative thereto, said strut being rigidly affixed at its rear end to the outer end of the lower of said support bars; an upwardly and rearwardly curved longitudinally extending stabilizer bar, said stabilizer bar being pivotally connected at its front end to the front of the rear portion of said strut for transverse vertical pivotal movement relative thereto, and at its rear end to the upper end of said first-mentioned shock absorber for longitudinal vertical pivotal movement relative thereto; a longitudinally extending rocker arm pivotally connected at its front end to the intermediate portion of said stabilizer bar for transverse vertical pivotal movement relative thereto, and connected at its rear end to the outer end of said first-mentioned axle; a longitudinal spacer bar interconnecting the inner portions of the lower of said support bars and said strut; and means for pivotally connecting the mid-portions of said support bars and said strut to the mid-portion of said sidecar whereby said wheel and said sidecar may simultaneously assume a vertical angle similar to that of the rear wheel of said motorcycle.

4. Connection means for use in coupling a sidecar to a motorcycle, said motorcycle having its rear axle supported between a pair of vertically extending shock-absorbers, comprising: an axle for supporting the wheel of said sidecar normally adapted to be coaxially aligned with the rear axle of the motorcycle; an auxiliary vertically extending shock absorber mounting the inner end of the axle of said sidecar for vertically dampened movement relative thereto; a pair of parallel vertically-spaced horizontal support bars adapted to be normally aligned with said axles; means for pivotally connecting the inner ends of said bars to the top and bottom of one of the shock absorbers supporting the rear axle of said motorcycle for transverse vertical pivotal movement relative thereto; means for pivotally connecting the outer ends of said bars to the upper and lower ends of said auxiliary shock absorber for vertical pivotal movement relative thereto; a horizontal strut having an outwardly and rearwardly inclined front portion and a longitudinally extending rear portion; means for pivotally connecting the front end of said strut to the front portion of the frame of the motorcycle for transverse vertical pivotal movement relative thereto, said strut being rigidly affixed at its rear end to the outer end of the lower of said support bars; an upwardly and rearwardly curved longitudinally extending stabilizer bar, said stabilizer bar being pivotally connected at its front end to the front of the rear portion of said strut for transverse vertical pivotal movement relative thereto, and at its rear end to the upper end of said auxiliary shock absorber for longitudinal vertical pivotal movement relative thereto; a longitudinally extending rocker arm pivotally connected at its front end to the intermediate portion of said stabilizer bar for transverse vertical pivotal movement relative thereto, and connected at its rear end to the outer end of the axle of said sidecar; a longitudinal spacer bar interconnecting the inner portions of the lower of said support bars and said strut; and means for pivotally connecting the mid-portions of said support bars and said strut to the mid-portion of said sidecar whereby said wheel and said sidecar may simultaneously assume a vertical angle similar to that of the rear wheel of said motorcycle.

References Cited in the file of this patent

UNITED STATES PATENTS

| 1,077,210 | Alesani | Oct. 28, 1913 |

FOREIGN PATENTS

| 5,500 | Great Britain | of 1909 |
| 17,769 | Great Britain | of 1904 |
| 19,597 | France | Dec. 28, 1914 |
| | (Addition to No. 467,858) | |
| 27,735 | Great Britain | of 1913 |
| 260,515 | Great Britain | Nov. 4, 1926 |